(12) United States Patent
Lenzing et al.

(10) Patent No.: US 6,620,221 B1
(45) Date of Patent: Sep. 16, 2003

(54) DEVICE FOR SEPARATING GAS AND LIQUID FROM A GAS-LIQUID MIXTURE FLOWING IN A LINE, AND METHOD FOR SEPARATING SAME

(75) Inventors: Thomas Lenzing, Ludwigsburg (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 09/831,817
(22) PCT Filed: Sep. 5, 2000
(86) PCT No.: PCT/DE00/03049
§ 371 (c)(1), (2), (4) Date: Nov. 9, 2001
(87) PCT Pub. No.: WO01/19486
PCT Pub. Date: Mar. 22, 2001

(30) Foreign Application Priority Data

Sep. 15, 1999 (DE) .......................... 199 44 189

(51) Int. Cl.[7] .............................................. B01D 19/00
(52) U.S. Cl. .............................. 95/262; 96/206; 96/207; 96/215; 96/220
(58) Field of Search .................... 95/248, 242, 260, 95/262; 96/179, 197, 206, 204, 219, 215, 220, 194, 207; 210/188

(56) References Cited

U.S. PATENT DOCUMENTS

| | | | | |
|---|---|---|---|---|
| 1,702,612 A | * | 2/1929 | Morse |
| 4,397,659 A | * | 8/1983 | Gowan et al. |
| 5,051,116 A | * | 9/1991 | Mattsson |
| 5,232,475 A | * | 8/1993 | Jepson |
| 5,507,858 A | * | 4/1996 | Jepson |
| 5,582,271 A | * | 12/1996 | Mielo |

FOREIGN PATENT DOCUMENTS

GB            931735        * 7/1963

* cited by examiner

*Primary Examiner*—Duane S. Smith
(74) *Attorney, Agent, or Firm*—Ronald E. Greigg

(57) ABSTRACT

The invention relates to a device for separating gas and liquid from a medium flowing in a line, and to a method for separating such a medium, in particular a gas-liquid mixture, in the device, which separates gas and liquid particles from one another at high and low flow speeds. High-quality phase separation that is independent of the flow speed is achieved in that both a surface tension of the liquid and different forces of inertia of the liquid and gas prevent a flow of the liquid through openings of a separator element.

19 Claims, 2 Drawing Sheets

DEVICE FOR SEPARATING GAS AND LIQUID FROM A GAS-LIQUID MIXTURE FLOWING IN A LINE, AND METHOD FOR SEPARATING SAME

CROSS-REFERENCE TO RELATED APPLICATIONS

This application is a 35 USC 371 application of PCT/DE 00/03049 filed on Sep. 5, 2000.

BACKGROUND OF THE INVENTION

1. Field of the Invention

The invention is based on a device for separating gas and liquid from a gas-liquid mixture flowing in a line, and on a method for separating such a mixture in the device.

2. Description of the Prior Art

In processing technology in general, and in automobile manufacture, rainwater in the intake nozzle of the air filter housing occurs, for instance, and in other industrial applications, the problem often arises that liquids are mixed with gases or vapors and have to be separated from one another. The problems that the liquids cause are, depending on the application, corrosion, functional problems, and sometimes the destruction of equipment.

From U.S. Pat. No. 5,507,858, it is known to use a gridlike perforated plate with openings in a housing connected in a line, in order to separate liquid particles, flowing in a medium, from the air or from a gas. However, at relatively high flow speeds, the degree of separation drops markedly, since the liquid flowing on the perforated plate does not pass through the openings.

SUMMARY OF THE INVENTION

The device according to the invention and the method has the advantage over the prior art that in a simple way, the quality of phase separation is independent of the mean flow velocity, because two physical effects are exploited.

It is advantageous if at least one inlet opening is located in an initial region of the housing, because as a result, one entire surface of a separator element can be utilized for the phase separation.

It is especially advantageous if the separator element, with a first end, adjoins the inlet opening, since as a result the separator element faces directly into the flow.

Depending on the design of a housing of the device, it is advantageous for the separator element to slope upward or downward in the main flow direction.

If a plurality of separator elements are used, it is advantageous to use at least one support foot. Then it is especially advantageous if the second or later separator element in the gas flow direction receives the liquid from the first or preceding separator element.

At low flow speeds, it is advantageous to design a shape of the at least one opening such that a surface tension of the liquid prevents a flow of the liquid through the at least one opening.

At high flow speeds, it is advantageous to design a shape of the at least one opening such that different forces of inertia of the liquid and gas prevent a flow of the liquid through the at least one opening.

It is advantageous to prevent the flow of the liquid through the at least one opening by means of the most favorable possible wetting angle, which is dictated by the shape of the at least one opening.

One advantageous shape of a cross section of the opening on the top side of the at least one separator element is a parallelogram-like shape, since this makes a favorable wetting angle possible.

One advantageous shape of the cross section of the at least one opening of the at least one separator element on the top side is a lenticular shape, since this makes a favorable wetting angle possible.

In the orientation of the at least one opening in the gas flow direction, it is advantageous that a longest main axis of the at least one opening is aligned in the gas flow direction.

BRIEF DESCRIPTION OF THE DRAWINGS

The foregoing and other features of the invention will be apparent from the detailed description contained below, taken in conjunction with the drawings, in which.

DESCRIPTION OF THE PREFERRED EMBODIMENTS

Figure 1:
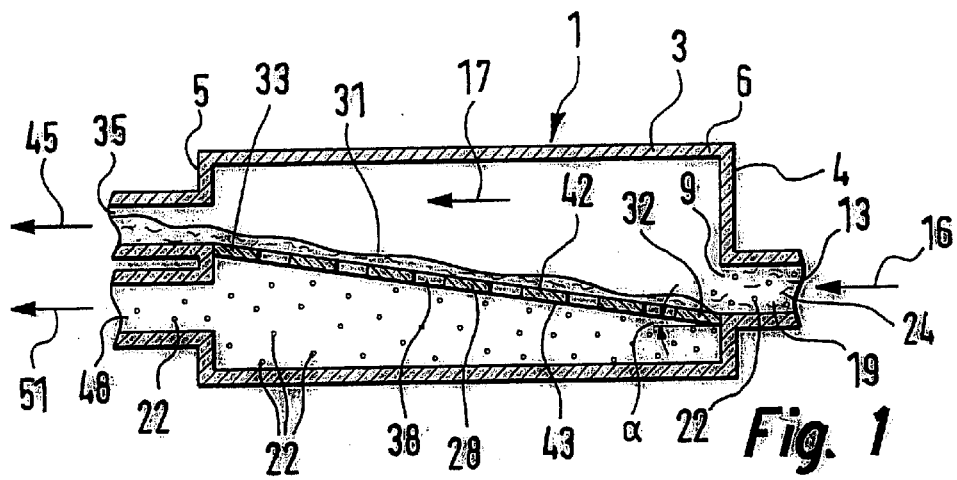
FIG. 1 is a sectional view of a first exemplary embodiment of the invention.

FIG. 1 shows a first exemplary embodiment of the invention in which the device 1 comprises a housing 3, which has an initial region 4, an end region 5, and a wall 6. On one side of the housing 3, there is a single inlet opening 9, for example. There can also be more than one inlet opening 9. A line 13 discharges into this inlet opening 9. A gas-liquid mixture 19 flows through the line 13 in the main flow direction, represented by an arrow 16. In the housing 3, the gas-liquid mixture 19 flows onward in a gas flow direction 17.

The gas-liquid mixture 19 comprises gas 22 and liquid particles 24. The gas 22 for instance comprises molecules of the various components of air. Other gases or gas mixtures are also possible. The liquid particles 24 can for instance be water. Other liquids or liquid mixtures are also conceivable.

In the housing 3 there is for instance a single separator element 28, which the gas-liquid mixture 19 encounters. There can also be more than one separator element 28. The separator element 28 extends at an acute positioning angle alpha to the main flow direction 16. In terms of the gas flow direction 17, the separator element 28 has a first end 32 and a second end 33.

The first end 32 preferably begins at a top side 42 of the separator element 28, directly at the inlet opening 9, and then merges, for instance smoothly, with the line 13.

On the top side 42 of the separator element 28, the inflow of the gas-liquid mixture 19 forms a liquid film 31. The liquid particles 24 in the liquid film are then carried onward from the separator element 28 in the positioning direction, while the gas 22 is capable of flowing through at least one opening 38 in the separator element 28 into a region between an underside 43 of the separator element and the wall 6. Liquid particles 24 that are deflected immediately but instead strike the separator element 28 flow along the top side 42 or are restrained around the openings because of the shape of the openings 38, as a consequence of a surface tension of the liquid.

The liquid particles 24 leave the housing 6, for instance through a liquid outlet opening 35, which is disposed in the end region 5 of the housing above the top side 42 of the separator element 28. Through the liquid outlet opening 35, the liquid flows onward in the line in a direction 45. The second end of the separator element 28 preferably directly adjoins the liquid outlet opening 35.

The single separator element 28, for instance, thus extends from the at least one inlet opening 9 to the outlet opening 35.

The gas 22 leaves the housing 6 through a gas outlet opening 48 in a direction 51, and also partly through the liquid outlet opening 35.

The gas outlet opening 48 is oriented toward the underside 43 of element 28. As a mechanism for separating liquid and gases, the great difference in inertia as a consequence of the highly different densities is often employed. Another effect, which is additionally utilized within the scope of the present invention, is based on the high surface tension that develops between liquid and gas.

Solid particles or dissolved salts contained in the liquid 24 are separated out along with the liquid 24.

Figure 2:
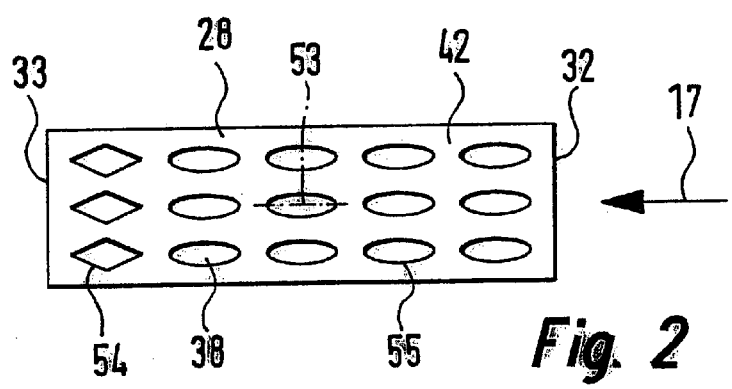
FIG. 2 is a separator element in plan view.

FIG. 2 shows a separator element 28 in plan view. For parts that are the same or function the same, the same reference numerals as in the previous figure are used. A cross section on the top side 42 shows the separator element 28 having openings 38 the shape of a parallelogram 54, for instance, or of an elliptical lens 55, so that the most favorable possible wetting angle between the liquid 24 and separator element 28 is presented to the liquid particles 24.

As a result of these shapes, there is a high ratio between circumference and a surface area bounded by the circumference, so that the liquid 24 can also close the opening 38 completely and be retained in the opening by the wetting, without the liquid flowing through the opening.

A longest main axis 53 of the openings 38 in a plane parallel to the top side 42 is preferably aligned in the gas flow direction 17. Some other orientation of this axis is also possible.

At low flow speeds, the surface tension prevents the liquid particles 24 from flowing through the separator element 28, while at high flow speeds, because of the positioning angle of the separator element 28, the different forces of inertia of the liquid and gas make good separating action possible. The separator element 28 in FIG. 2 for instance comprises three openings 38 disposed side by side, and five openings 38 disposed in line with one another in the gas flow direction 17.

The number of openings 38 required and, depending on the shape and size of the openings 38, the length of the separator element 28 are defined by a maximum incident liquid content of the gas-liquid mixture 19. Once all the openings 38 have been wetted, and a complete liquid film 31 has formed on a surface between the openings, a maximum liquid content of the gas-liquid mixture 19 is nearly attained, and can be increased further then only by means of a somewhat thicker liquid film 31. A further increase in the maximum liquid content of the gas-liquid mixture 19 is then achieved by means of a larger area of the top side 42 of the separator element 28 and/or by increasing the number of openings 38.

A surface roughness of the top side 42 also has an influence on the formation of the liquid film 31. A certain amount of surface roughness reinforces adhesion of the liquid film 31 to the top side 42 of the separator element 28 and thus increases the degree of separation. However, the surface roughness must not exceed a certain amount, because otherwise the flow conditions will change.

Figure 3:
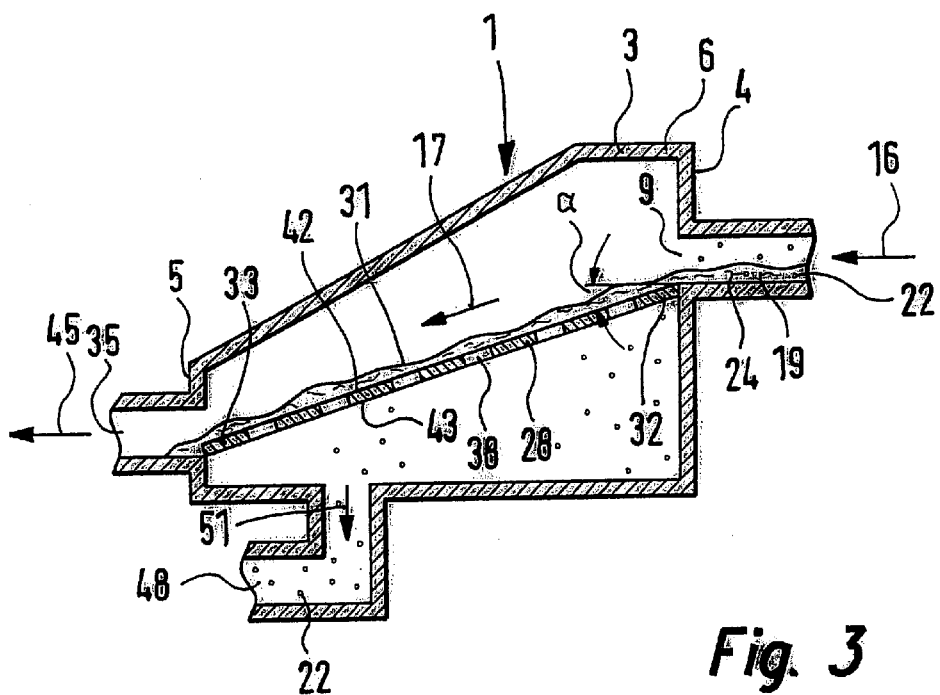
FIG. 3 is a further exemplary embodiment of the invention.

FIG. 3 shows a further exemplary embodiment of the invention with a separator element 28 that slopes downward in the flow direction 16. For elements that are the same or function the same, the same reference numerals as in the previous figures are used. The separator element 28 forms a negative angle alpha, for instance, with the main flow direction 16; that is, in terms of the main flow direction 16, the separator element 28 slopes downward. Thus the liquid outlet 35, while still located on the same side of the separator element 28 toward the top side 42 as the inlet opening 9, is however located at a lower level than the inlet opening. The gas outlet opening 48 in this example is disposed not in the end region 5 like the liquid outlet opening 35, but between the initial region 4 and the end region 5 of the housing 3. The gas 22 leaves the housing 3 for instance in a direction 51 perpendicular to the main flow direction 16.

In a radial cross section, the housing 3 can be round or polygonal, or any other shape. An axial cross section of the housing can for instance by square (FIG. 1), or wedge-shaped, as in FIG. 3.

Figure 4:
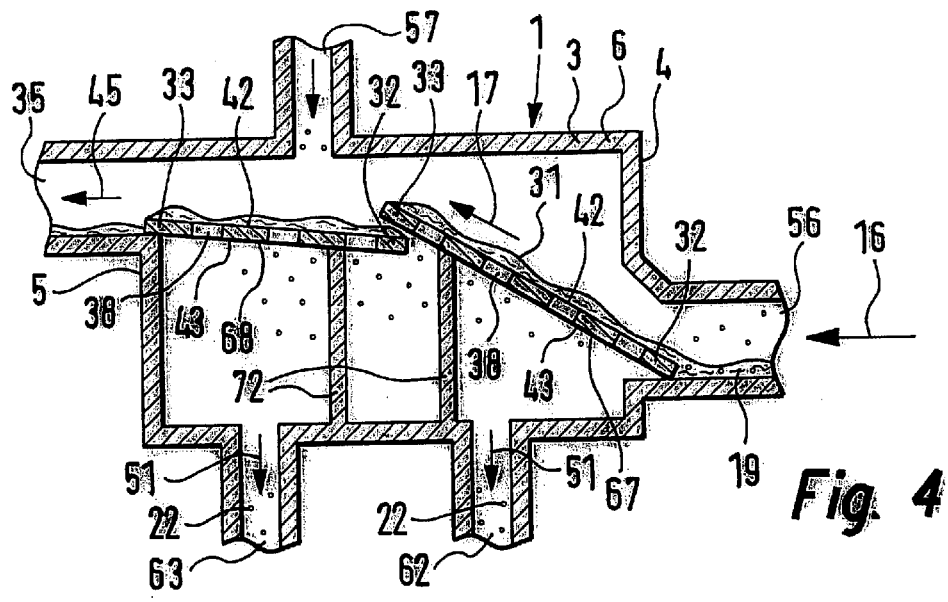
FIG. 4 is a further exemplary embodiment of the invention, with two separator elements.

FIG. 4 shows a further exemplary embodiment of the invention. The same reference numerals as in the previous figures are used for elements that are the same or function the same. The device 1 has a first inlet opening 56 and a second inlet opening 57, which by way of example are not located at the same level. Through the first inlet opening 56, the gas-liquid mixture 19 flows in the main flow direction 16 into the housing 3 in the initial region 4. Through the second inlet opening 57, the gas-liquid mixture 19 flows into the housing 3 perpendicular to the main flow direction 16, for instance. A first gas outlet opening 62 and a second gas outlet opening 63 are for instance also provided, which are disposed as in FIG. 3. Any other combination of a disposition of the gas outlet openings 48, 62, 63 of FIGS. 1 and 3 is also possible.

A first separator element 67 and a second separator element 68, which both rise in the gas flow direction 17, are located in the housing 3. The gas-liquid mixture 19 from the first inlet opening 56 encounters the first separator element 67 on the top side 42. A liquid film 31 forms on the top side 42. The second separator element 68 receives the liquid 24 from the first separator element 67. A further gas-liquid mixture 19 also flows in perpendicular to the main flow direction, for instance onto the second separator element 68, through the second inlet opening 57. From the second separator element 68, the liquid 24 flows out through the liquid outlet opening 35. Both separator elements 67, 68 rest for instance on a support foot 72.

Figure 5:
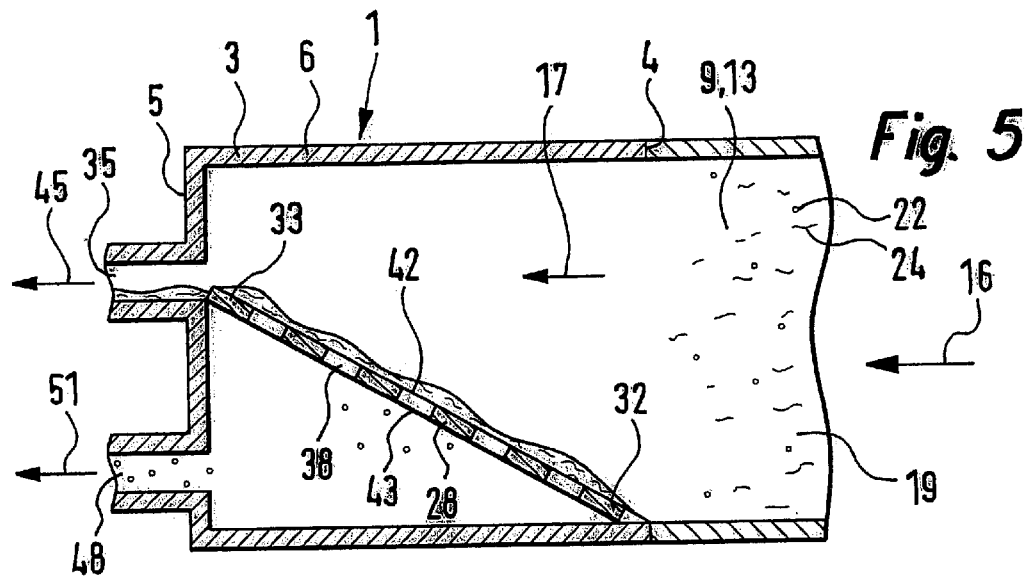
FIG. 5 is a further exemplary embodiment of the invention.

FIG. 5 shows a further exemplary embodiment of the invention. The same reference numerals as in previous figures are used for elements that are the same or function the same.

In a distinction from FIG. 1, the housing 3 and the line 13 have the same cross section transversely to the main flow direction 16 and thus merge with one another without any change in cross section.

Figure 6:
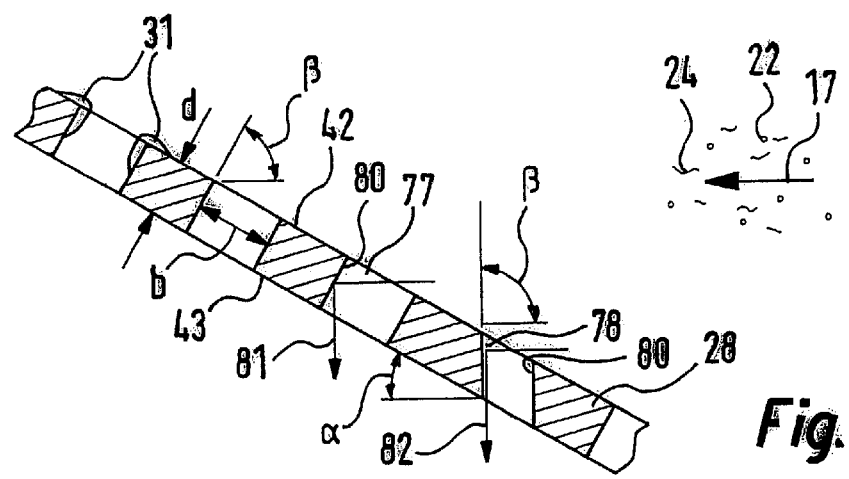
FIG. 6 is an enlarged detail of a separator element.

FIG. 6 shows an enlarged detail of the separator element 28. The same reference numerals as in previous figures are used for elements that are the same or function the same.

Corresponding for instance to the openings 38, the separator element 28 has a first opening 77 and a second opening 78. The opening 77 was made for instance by vertical punching out of a metal sheet; that is, the opening 77 extends perpendicular to the top side 42. The second opening 78 was made in the metal sheet at an angle, for instance, so that in the installed state of the separator element 28, the opening 78 extends perpendicular to the gas flow direction 17.

Flowing gas 22 cannot pass through the openings 77, 78 unhindered, without being covered by an inner wall 80 of the openings 77, 78. A first arrow 81 and a second arrow 82 indicate examples of a course of the gas through the openings 77 and 78, respectively.

An opening angle beta of the opening is formed by an angle between the main flow direction 17 and the inner wall 80. Thus the opening angle beta of the opening 78 is 90 degrees, for instance, and the opening angle beta of the opening 77 is an acute angle.

The opening angle beta of the opening 38, 77, 78 relative to the gas flow direction 17 should be selected such that depending on a thickness d, that is, the length of the opening 38, 77, 78 in the direction in which the gas 22 moves through the opening 38, 77, 78, and depending on a width b of the opening 38, 77, 78, that is, the length of the opening 38 in the gas flow direction 17, and depending on the positioning angle alpha, gas 22 cannot pass unhindered through the opening 38, 77, 78.

The other parameters are adapted for the sake of a high quality of the phase separation. For a given positioning angle alpha and width b, for instance, the following is true: The greater the thickness d, the smaller the opening angle beta can be. Correspondingly: The greater the thickness d, the greater the width b can be.

The foregoing relates to preferred exemplary embodiments of the invention, it being understood that other variants and embodiments thereof are possible within the spirit and scope of the invention, the latter being defined by the appended claims.

What is claimed is:

1. A device (1) for separating gas (22) and liquid (24) from a gas-liquid mixture (19) flowing in a line (13), which device comprises:
   a) a housing (3),
   b) said housing (3) communicating with said line (13),
   c) said housing (3) having at least one inlet opening (9), into which the gas-liquid mixture (19) flows out of the line (13) in a main flow direction (16),
   d) said housing (3) having at least one liquid outlet opening (35) for the liquid (24) of the gas-liquid mixture (19),
   e) said housing (3) having at least one gas outlet opening (48) for the gas (22) of the gas-liquid mixture (19),
   f) said housing (3) having at least one separator element (28) with openings (38), which separator element (28) separates the gas-liquid mixture (19) into gas (22) and liquid (24),
   g) said at least one separator element (28) extending in said housing at least partly in a main flow direction (16),
   h) there being a gas flow direction (17) in the housing (3), said at least one separator element (28), as viewed in the gas flow direction (17), having a first end (32) and a second end (33) which is opposite the first end (32), said at least one separator element (28) having its second end adjoining said liquid outlet opening (35).

2. A device (1) for separating gas (22) and liquid (24) from a gas-liquid mixture (19) flowing in a line (13), which device comprises:
   a) a housing (3),
   b) said housing (3) communicating with said line (13),
   c) said housing (3) having at least one inlet opening (9), into which the gas-liquid mixture (19) flows out of the line (13) in a main flow direction (16),
   d) said housing (3) having at least one liquid outlet opening (35) for the liquid (24) of the gas-liquid mixture (19),
   e) said housing (3) having at least one gas outlet opening (48) for the gas (22) of the gas-liquid mixture (19),
   f) said housing (3) having at least one separator element (28), which separates the gas-liquid mixture (19) into gas (22) and liquid (24),
   g) said at least one separator element (28) extending in said housing at least partly in a main flow direction (16),
   h) there being a gas flow direction (17) in the housing (3), said at least one separator element (28), as viewed in the gas flow direction (17), having a first end (32) and a second end (33) which is opposite the first end (32), said at least one separator element (28) having its second end adjoining said liquid outlet opening (35),
   wherein said separator element (28), on a top side (42) that is oriented toward said inlet opening (9), faces into the flow of the gas-liquid mixture (19), and wherein said liquid outlet opening (35) is oriented toward the top side (42).

3. The device of claim 2, wherein said at least one separator element (28) has an underside (43), which is opposite said top side (42), and said at least one gas outlet opening (48) is oriented toward said underside (43).

4. The device of claim 2, wherein said housing (3), as viewed in the gas flow direction (17), has an initial region (4) and an end region (6), and at least one inlet opening (9) is located in the initial region (4) of the housing (3).

5. The device of claim 4, further comprising at least one liquid outlet opening (35) located in the end region (5) of said housing (3).

6. The device of claim 2, wherein said at least one separator element (28), with its first end (32), adjoins the inlet opening (9).

7. The device of claim 2, wherein said at least one separator element (28) rises, viewed in the main flow direction (16).

8. The device of claim 2, wherein said at least one separator element (28) descends, viewed in the main flow direction (16).

9. The device of claim 2, wherein said at least one separator element (28) extends from an inlet opening (9) to a liquid outlet opening (35).

10. The device of claim 1, further comprising a first separator element (67) receives the gas-liquid mixture (19) from said inlet opening (9), and a separator element (68) downstream of said first separator element in the gas flow direction (16) receives the gas-liquid mixture (19) of the first separator element (67).

11. The device of claim 1, wherein said at least one separator element (28) rests on at least one support foot (72).

12. A device (1) for separating gas (22) and liquid (24) from a gas-liquid mixture (19) flowing in a line (13), which device comprises:
   a) a housing (3),
   b) said housing (3) communicating with said line (13),
   c) said housing (3) having at least one inlet opening (9), into which the gas-liquid mixture (19) flows out of the line (13) in a main flow direction (16), d) said housing (3) having at least one liquid outlet opening (35) for the liquid (24) of the gas-liquid mixture (19), e) said housing (3) having at least one gas outlet opening (48) for the gas (22) of the gas-liquid mixture (19), f) said housing (3) having at least one separator element (28), which separates the gas-liquid mixture (19) into gas (22) and liquid (24), g) said at least one separator element (28) extending in said housing at least partly in a main flow direction (16), h) there being a gas flow direction (17) in the housing (3), said at least one separator element (28), as viewed in the gas flow direction (17), having a first end (32) and a second end (33) which is opposite the first end (32), said at least one separator element (28) having its second end adjoining said liquid outlet opening (35), wherein said at least one separator element (28) has at least one opening (38), a thickness d and a width b of the opening, a positioning angle (alpha) between the separator element (28) and the gas flow direction (17), a shape of the opening (38), in particular an opening angle (beta) between the main flow direction (17) and the inner wall of the opening (38) and the gas flow direction (17) are selected such that a gas (22) flowing in the gas flow direction (17) cannot pass through the opening (38) without being deflected.

13. The device of claim 12, wherein a shape of said at least one opening (38), for low flow speeds, is designed such that a surface tension of the liquid (24) prevents a flow of the liquid (24) through said at least one opening (38).

14. The device of claim 12, wherein a shape of the at least one opening (38), for high flow speeds, is selected such that different forces of inertia of the liquid (24) and gas (22) prevent a flow of the liquid (24) through said at least one opening (38).

15. The device of claim 12, wherein a shape of said at least one opening (38) for the liquid (24) enables an optimum wetting angle.

16. The device of claim 12, wherein a cross section of the opening (38) of said at least one separator element (28) parallel to the top side (42) is parallelogram-like.

17. The device of claim 12, wherein the cross section of said at least one opening (38) of the at least one separator element (28) parallel to the top side (42) is lenticular.

18. The device of claim 12, wherein said at least one opening (38) is oriented in the gas flow direction (17) in such a way that a longest main axis (53) of said at least one opening (38) is aligned in the gas flow direction (17).

19. A method for separating a liquid (24) and a gas (22) of a gas-liquid mixture (13) flowing in a line (13) by means of a separation device (1) including:

a) a housing (3), b) the housing (3) communicating with the line (13), c) the housing (3) having at least one inlet opening (9), into which the gas-liquid mixture (19) flows out of the line (13) in a main flow direction (16), d) the housing (3) having at least one liquid outlet opening (35) for the liquid (24) of the gas-liquid mixture (19), e) the housing (3) having at least one gas outlet opening (48) for the gas (22) of the gas-liquid mixture (19), f) the housing (3) having at least one separator element (28), which separates the gas-liquid mixture (19) into gas (22) and liquid (24), g) the at least one separator element (28) extending in the housing at least partly in a main flow direction (16), h) there being a gas flow direction (17) in the housing (3), the method comprising the steps of:

i) positioning separator element (28) in a region of the inlet opening (9), ii) providing at least one opening (38) in the separator element (28), iii) positioning the separator element (28) to extend at least partly in a gas flow direction (17) in the housing (3), iv) orienting a top side (42) of the separator element (28) is oriented toward the inlet opening (9), with the top side (42) of the separator element (28) facing into the flow of the gas-liquid mixture (19), v) orienting the gas outlet opening (48) toward an underside (43) of the separator element (28) with the underside (43) opposite the top side (42), and flowing the gas-liquid mixture (19) out of the line (13) into the housing (3) onto the top side (42) of the at least one separator element (28), then along over or on the at least one separator element (28), in order to separate gas (22) and liquid (24) from one another, whereby different forces of inertia of the liquid (24) and gas (22) and a surface tension of the liquid (24) prevent a flow of the liquid (24) through the at least one opening (38), and then flowing gas (22) into the gas outlet opening (48) and the liquid (24) from the top side (42) directly into the liquid outlet opening (35).

* * * * *